(12) United States Patent
Berger et al.

(10) Patent No.: US 9,272,924 B2
(45) Date of Patent: Mar. 1, 2016

(54) PROCESS AND APPARATUS TO REMOVE AND DESTROY VOLATILE ORGANIC COMPOUNDS BY ATOMIZING WATER IN OZONE ATMOSPHERE

(71) Applicants: Marcia Jada Berger, Wayland, MA (US); Isaac Wayne Anderson, Natick, MA (US)

(72) Inventors: Marcia Jada Berger, Wayland, MA (US); Isaac Wayne Anderson, Natick, MA (US)

(73) Assignee: ABC Sails, Inc., Sudbury, MA (US)

( * ) Notice: Subject to any disclaimer, the term of this patent is extended or adjusted under 35 U.S.C. 154(b) by 503 days.

(21) Appl. No.: 13/661,023

(22) Filed: Oct. 25, 2012

(65) Prior Publication Data

US 2014/0120018 A1    May 1, 2014

(51) Int. Cl.
| | |
|---|---|
| *C02F 1/20* | (2006.01) |
| *C02F 1/78* | (2006.01) |
| *B01D 1/16* | (2006.01) |
| *B01D 19/00* | (2006.01) |
| *B01D 53/44* | (2006.01) |
| *B01D 53/70* | (2006.01) |
| *B01D 3/34* | (2006.01) |
| *C02F 1/00* | (2006.01) |
| *C02F 101/32* | (2006.01) |

(52) U.S. Cl.
CPC ... *C02F 1/20* (2013.01); *B01D 1/16* (2013.01); *B01D 3/346* (2013.01); *B01D 19/0005* (2013.01); *B01D 19/0047* (2013.01); *B01D 53/44* (2013.01); *B01D 53/70* (2013.01); *B01D 2251/104* (2013.01); *B01D 2253/102* (2013.01); *B01D 2257/708* (2013.01); *B01D 2257/7027* (2013.01); *C02F 1/001* (2013.01); *C02F 1/78* (2013.01); *C02F 2101/322* (2013.01); *C02F 2209/005* (2013.01); *C02F 2209/235* (2013.01)

(58) Field of Classification Search
CPC .............. C02F 1/001; C02F 1/20; C02F 1/78; C02F 2101/30; C02F 2101/32; C02F 2101/322; C02F 2101/327; C02F 2209/005; C02F 2209/235; C02F 2103/06; C02F 2201/78; C02F 2201/784; C02F 2303/02; B01D 19/005; B01D 19/0047; B01D 53/44; B01D 53/70; B01D 2251/104; B01D 2257/7027; B01D 2257/708; B01D 1/16; B01D 3/346; B01D 3/008; B01D 3/009; B01D 2253/102; B01F 3/04007; B01F 3/04021; B01F 3/04056; B01F 3/04085
See application file for complete search history.

(56) References Cited

U.S. PATENT DOCUMENTS

| | | | | |
|---|---|---|---|---|
| 1,420,046 A | * | 6/1922 | MacGregor et al. | 210/760 |
| 5,246,556 A | * | 9/1993 | Sawamoto et al. | 204/176 |

(Continued)

*Primary Examiner* — Lucas Stelling
(74) *Attorney, Agent, or Firm* — ABC Sails, Inc.

(57) ABSTRACT

A process and apparatus to remove and breakdown volatile organic compounds from drinking water, groundwater, wastewater, frack water and air exhaust. The process entails filling a tank, chamber, pipe, or column with ozone-containing gas, introducing into this ozone-containing gas-filled tank, chamber, pipe or column, very small droplets of water, contaminated with volatile organic compounds which then volatilize out from the water and break down in the ozone gas thereby improving the water quality and associated air quality. The current invention has been shown to achieve more than 99% combined removal efficiency. The process can also be used to treat air streams containing volatile organic compounds. To increase efficiency, ozone is introduced where the atomized particles are smallest. Three configurations utilizing said process include upward and downward spray of contaminated water into ozone and pumping through openings in an enclosure to a reaction chamber filled with ozone-containing gas.

12 Claims, 3 Drawing Sheets

(56) References Cited

U.S. PATENT DOCUMENTS

| | | | |
|---|---|---|---|
| 5,397,480 A * | 3/1995 | Dickerson | 210/752 |
| 5,447,640 A * | 9/1995 | Omi et al. | 210/748.19 |
| 5,785,866 A * | 7/1998 | Gehringer et al. | 210/748.16 |
| 6,090,294 A * | 7/2000 | Teran et al. | 210/739 |
| 6,103,130 A * | 8/2000 | Sherman | 210/754 |
| 6,126,842 A * | 10/2000 | Decker | 210/760 |
| 6,207,064 B1 * | 3/2001 | Gargas | 210/752 |
| 6,251,289 B1 * | 6/2001 | Sherman | 210/758 |
| 6,274,053 B1 * | 8/2001 | Conrad | 210/760 |
| 6,280,633 B1 * | 8/2001 | Conrad et al. | 210/739 |
| 6,283,674 B1 * | 9/2001 | Suthersan | 210/747.8 |
| 6,348,157 B1 * | 2/2002 | Ohmi et al. | 210/760 |
| 6,383,399 B2 * | 5/2002 | Sherman | 210/748.09 |
| 6,419,831 B2 * | 7/2002 | Wang | 210/668 |
| 6,444,131 B1 * | 9/2002 | Sherman | 210/758 |
| 6,451,612 B1 * | 9/2002 | Campo et al. | 436/135 |
| 6,503,403 B2 * | 1/2003 | Green et al. | 210/748.1 |
| 6,780,331 B2 * | 8/2004 | Galatro et al. | 210/747.8 |
| 6,824,695 B2 * | 11/2004 | Tempest, Jr. | 210/760 |
| 6,827,861 B2 * | 12/2004 | Kerfoot | 210/741 |
| 7,264,747 B2 * | 9/2007 | Kerfoot | 252/186.21 |
| 7,666,313 B2 * | 2/2010 | Kerfoot | 210/747.8 |
| 8,029,678 B2 * | 10/2011 | Philippon | 210/760 |
| 8,137,703 B2 * | 3/2012 | Chiba et al. | 424/613 |
| 2002/0190404 A1 * | 12/2002 | Baarda | 261/115 |
| 2004/0237782 A1 * | 12/2004 | Decker | 95/211 |
| 2005/0008555 A1 * | 1/2005 | Hsieh et al. | 423/235 |
| 2006/0054554 A1 * | 3/2006 | Spears et al. | 210/620 |
| 2008/0190862 A1 * | 8/2008 | Matsuura et al. | 210/748 |
| 2011/0068060 A1 * | 3/2011 | Hatten | 210/739 |
| 2012/0076716 A1 * | 3/2012 | Suchak et al. | 423/437.1 |
| 2013/0015142 A1 * | 1/2013 | Brooke et al. | 210/718 |

* cited by examiner

PROCESS AND APPARATUS TO REMOVE AND DESTROY VOLATILE ORGANIC COMPOUNDS BY ATOMIZING WATER IN OZONE ATMOSPHERE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of Invention

The present invention relates to an ozone-based water treatment process and apparatus to remove volatile organic compounds from water by means of surrounding small droplets of water with ozone.

Industrial and consumer-based technological processes have caused widespread contamination of the soil, groundwater and drinking water supplies, many of these pollutants being volatile organic compounds. Industrial process water may also contain volatile organic compounds and for this reason require treatment prior to discharge, for reuse in its processes or first time use for processes requiring purified water. The oil and gas industry engages in hydraulic fracking which generates volatile organic contaminated wastewater. Use of chlorine to disinfect water supplies often causes formation of volatile organic compounds. Volatile organic compounds in the groundwater volatilize into buildings causing indoor air pollution. Many volatile organic compounds are toxic to humans including some being carcinogenic. Certain volatile organic compounds can negatively impact biological ecosystems, and erode the ozone layer in the upper atmosphere, which provides protection from radiation exposure.

The present invention is intended for use in treating hazardous waste sites, drinking water supplies, frack water and other oil and gas wastes, agricultural waters, groundwater being managed at construction sites and industrial wastewater.

Examples of common volatile organic compounds requiring treatment to government-set concentration standards include gasoline components: benzene, ethyl benzene, toluene, and xylene and chlorinated hydrocarbon components: tetrachloroethylene, trichloroethylene, 1,2-cis-dichloroethylene and vinyl chloride.
Available Information:

The present invention relies on industry knowledge, that ozone is useful for destroying volatile organic compounds. This has been long known, as reflected in the following excerpt from a 1997 solicitation on the United States Environmental Protection Agency's website whereby they sought a method to dissolve ozone in wastewater to remove contaminants in wastewater: It is noted as per this example, that industry knowledge concerns water treatment by means of dissolving or bubbling ozone into the water which is different from the current invention whereby volatile organic compounds are stripped from the water by atomizing the water in an ozone atmosphere.

EPA Contract Number: 68D70043
Title: Enhanced Ozone Treatment of Wastewater With Periluoromembranes
Investigators: Nemser, Stuart
Small Business: Compact Membrane Systems Inc.
EPA Contact: Manager, SBIR Program
Phase: I
Project Period: Sep. 1, 1997 through Mar. 1, 1998
Project Amount: $70,000
RFA: Small Business Innovation Research (SBIR)—Phase I (1997)
Research Category: Water and Watersheds, SBIR—Water and Wastewater
Description:
  Ozone treatment of wastewater to destroy organic contaminants prior to discharge into the environment is an extremely effective advanced oxidation technology. To date the use of this powerful technology has been limited in part by the relatively high capital costs of an efficient ozone to water, gas-liquid, mass transfer system. Existing ozone injection devices must overcome the inherently low mass transfer rate of gas into liquid. This project will investigate enhanced transfer of ozone into water through novel perfluoropolymer membranes. These membranes have unique oxygen and ozone permeability properties, which should allow direct bubbleless transfer of ozone into water. Phase I of this project will focus on fabrication of small scale, less than 3 ft2, test membranes and demonstration of high efficiency, bubbleless transfer of ozone into clean and synthetic wastewater in the laboratory. Demonstration of fouling resistance also will be accomplished.

The present invention is based on principles of Henry's Law which states that at constant temperature, the amount of a given gas dissolved in a given type and volume of liquid is directly proportional to the partial pressure of that gas in equilibrium with that liquid. Because the ozone destroys the volatile organic compounds, a steep concentration gradient is created at the edge of the water causing additional volatile organic compounds to leave the water.

A prototype of the current invention, built in accordance with Configuration 1, shown in FIG. 1, was operated and tested in order to assess its usefulness. During a test run conducted on Oct. 11, 2012, the prototype unit exhibited the ability to remove 98 to 99 percent of each of four chlorinated hydrocarbons dissolved in 38 gallons of groundwater impacted by former dry cleaning operations. The principle contaminant was Tetrachloroethylene which is a chlorinated hydrocarbon. Laboratory testing of a sample of this water whose results are shown in Table 1, showed also Trichloroethene, Cis-1,2-Dichloroethene and Vinyl Chloride, these also being chlorinated hydrocarbons and are breakdown products commonly associated with Tetrachloroethene especially where biodegradation is being conducted as was the case here.

It is noted that prior to this pilot test, other testing was done of configurations involving ozone in headspace and ozone bubbled into water using the same concentration of ozone as used in this pilot test. Significant degradation was not observed except in one configuration involving a venturi injector which exhibited chlorinated hydrocarbon degradation but following four passes through it, still had not achieved the results achieved in this subject pilot test which the current invention is based on. It is hypothesized that the venturi's partial effectiveness rested upon its forming a vacuum pocket where the ozone enters the venturi within which some atomizing was occurring, this being the mechanism that is further enabled by the current invention.

Operating Parameters were as Follows:
Distance Traveled from nozzle to reservoir: 6.5 feet
Residence time; approximately 0.5 seconds
Flow rate: 1.5 gallon per minute
Water pressure in pipe: 48 psi+−2 psi
Volume of groundwater treated: 38 gallons
Ambient conditions: 57 deg; humidity: 34%
Ozone concentration in tank: 0.07 g/L approximately
Total initial volatile organic compound concentration: 28,000 ug/L
Results:
Total final volatile organic compound concentration: 254.7 ug/L
Total combined removal efficiency of greater than 99%

TABLE 1

Con-Test Analytical Laboratory
Analytical Testing Report
Work Order: 12J0497
Report Date: Oct. 12, 2012 5:47:07 PM
Sample Date: Oct. 11, 2012

| U.S.E.P.A Method 8260 Analyte | ug/l Influent | ug/l Effluent | % Removal |
|---|---|---|---|
| Tetrachloroethene | 12000 | 130 | 99 |
| Trichloroethene | 1400 | 24 | 98 |
| Cis-1,2-Dichloroethene | 13000 | 95 | 99 |
| Vinyl Chloride | 1600 | <2 | 100 |
| Trans-1,2-Dichloroethene | <200 | 4.2 | * |
| 1,1,2-Tricloroethane | <200 | 1.5 | * |

* Beginning concentration below detection.

It was concluded that the pilot test showed efficient removal of all four types of chlorinated hydrocarbons that were present in the waste stream. Given the commonalities of chemical bonds and considering the recalcitrant nature of the chlorinated hydrocarbons in this pilot test, it can be assumed that the current invention will also work to break down many other types of volatile organic compounds such as petroleum hydrocarbons which are less recalcitrant than those that were tested.

Current and Prior Art:

Current art involves ozone reactions with volatile organic compounds where the ozone is either dissolved into the water undergoing treatment or bubbled into the water undergoing treatment. By comparison the current invention somewhat conversely involves ozone reacting with volatile organic compounds whereby the contaminated water is atomized into a chamber filled with ozone-containing gas.

Other related current and prior art includes a type of air stripping technology. This technology entails atomizing contaminated water at the top of the tower, letting it drop down through packing material against an upward countercurrent of air, thereby stripping volatile organic compounds from the water and transferring contaminants to the air stream which is then either treated prior to, or directly discharged to the ambient air. By comparison, the current invention involves replacing the countercurrent upward air stream with ozone, introduced optimally where atomized particles are smallest, which removes the volatile organic compound contaminants by destroying them, thereby offsetting the vapor pressure equilibrium which causes an exodus of volatile organic compounds from the water. Since the contaminants are destroyed, no air treatment is required other than to either recycle the ozone or eliminate it by directing the ozone exhaust through a catalyst or activated carbon.

Much of the prior art relies on aqueous-based reactions whereby dissolved ozone attacks dissolved volatile organic compounds via a hydroxyl intermediary ion. This aqueous-based reaction is less robust per a given volume and concentration of ozone gas inflow compared with the gas-based reaction relied on for the current invention. The aqueous-based reaction has applications such as controlling microbial growth in food where lower concentrations of ozone are sufficient.

To strengthen the process to work on breaking down volatile organic compounds, simply increasing the concentration of ozone inflow is often not a good option, given that increasing concentration makes it increasingly dangerous to work with, due to its toxic and explosive nature. The aqueous-based reaction can be strengthened by increasing the pressure in a reaction chamber and increasing the concentration of incoming ozone. This necessitates making tanks, pumps and piping stronger and more chemical resistant, and pumps larger, thereby making this a more capital intensive and power consuming operation, compared with that required by the current invention. The current invention has applicability at hazardous waste sites where a more portable unit is needed; pressurized units are heavy and therefore not practical to move about and among multiple hazardous waste sites.

Ozone bubbles have become in more widespread use for reacting in situ with volatile organic compounds that are contaminants in groundwater. While in bubbles, the ozone is not as prone to undergoing hydrolysis or reacting with non-polluting, natural organic content and breaking down to less energized molecules. Ozone bubbles are thereby useful in subsurface cleanup where they can travel beyond the point of application prior to being consumed in reactions with subsurface organics. However, the ozone bubbles are often not effective in breaking down volatile organic compounds unless used in combination with other chemicals, one being hydrogen peroxide. The current invention provides a better solution than ozone bubbles, micro-bubbles or nano-bubbles for applications of ozone that are not in subsurface groundwater.

U.S. Pat. No. 6,962,654 by Arnaud, Nov. 8, 2005 entails a method for supplying high concentrations of dissolved oxygen and ozone for chemical and biological processes. The process employs use of molecular sieves. The availability of increasingly affordable and convenient units that generate concentration oxygen coupled with ozone gas has increased in recent years, thereby enabling more options for its use.

Patents using ozone to treat water were reviewed for similarity to the current invention as follows:

U.S. Pat. No. 8,029,678 by Philippon, Oct. 4, 2011, this involves a water treatment method whereby a fraction of the main stream is diverted and circulated counter-current to an ozone-rich carrier gas whereby the ozone enriched fraction of water is diluted in the main stream.

U.S. Pat. No. 8,137,703 bu Cjoba. et al, Mar. 20, 2012 entails a method to produce ozone nano-bubbles capable of staying in solution for an extended period, accomplished by physical irritation to ozone microbubbles in aqueous solution.

U.S. Pat. No. 5,447,640 by Omi, Sep. 5, 1995 entails using ionized water for sterilization and treatment.

Kerfoot: United States Patents as follows involve use of micro-bubbles: U.S. Pat. No. 7,666,313 dated Feb. 23, 2010, groundwater and subsurface remediation; U.S. Pat. No. 7,264,747 dated Sep. 4, 2007, coated microbubbles for treating an aquifer or soil formations; U.S. Pat. No. 6,827,861, dated Dec. 7, 2004, gas-gas-water treatment system for groundwater and soil remediation involve subsurface in situ processes whereby ozone is dissolved or bubbled into the water.

U.S. Pat. No. 6,824,695 by Tempest, Jr., Nov. 30, 2004 entails system and method for water purification involving a self-contained portable water purification system including ozone supply, contact chamber mixing a contaminated water stream with ozone, and ozone destructor and biologically active carbon filter.

U.S. Pat. No. 6,780,331 by Galatro, et al., Aug. 24, 2004 involves a process of injecting ozone into contaminated water under high pressure.

U.S. Pat. No. 6,773,609 by Hashizume, Aug. 10, 2004 advanced water treatment system and advanced water treatment method using fine bubbles of ozone combined with hydrogen peroxide, UV radiation, and electrolysis treatment.

U.S. Pat. No. 6,503,403 by Green, et al., Jan. 7, 2003, involves a gas-liquid contact apparatus whereby a gas-liquid mixture is ejected through nozzles in a reaction vessel. The nozzles are sized to produce gas bubbles in the liquid and initiate rotational flow of the gas-liquid mixture in the reaction vessel. This elongates ozone contact time.

U.S. Pat. No. 6,451,612 by Campo, et al., Sep. 17, 2002 entails a method for determining a level of treatment with ozone of a liquid to be treated entailing sampling and measuring residual oxidant concentration at predetermined time intervals.

U.S. Pat. No. 6,444,131 by Sherman, Sep. 3, 2002 entails treating contaminated liquids with sub-micron size bubbles of ozone or chlorine dioxide to remove organic and biological contaminants from a liquid.

U.S. Pat. No. 6,348,157 by Ohmi, et al., Feb. 19, 2002 is a cleaning method for producing pure water or ultrapure water for semiconductor manufacturing processes. The ozone is used incombination with surfactant and other additives dissolved in clean water while applying a vibration to clean solid objects.

U.S. Pat. No. 6,419,831 by Wang, Jul. 16, 2002 entails mixing water with ozone to provide a substantially homogenious mixture that is then transported along a confined flow path of sufficient length to complete decomposition of the ozone.

U.S. Pat. No. 6,383,399 by Sherman, May 7, 2002 entails removing organic contaminants from a liquid by using sub-micron size bubbles dispersed into the liquid undergoing treatment.

U.S. Pat. No. 6,283,674 by Suthersan, Sep. 4, 2001 entails in-well treatment of groundwater to remove contaminants from the phreatic zone and from groundwater involving mixing ozone with water by introducing ozone into the water whereby mixing is enhanced by use of packing balls in an eduction tube where the mixing takes place.

U.S. Pat. No. 6,280,633 by Conrad, et al., Aug. 28, 2001 is for a liquid purification apparatus whereby off-gas from the purification process is passed through an ozone detector that provides an electric signal corresponding to the ozone concentration in the off-gas, which is used to control the length of the ozonation process.

U.S. Pat. No. 6,274,053 by Conrad, Aug. 14, 2001 entails an ozonation, two-step treatment process entailing first introducing ozone-containing gas into a liquid at a certain concentration followed by introducing ozone-containing gas into the liquid at a higher concentration.

U.S. Pat. No. 6,251,289 by Sherman, Jun. 26, 2001 entails removing organic contaminants from a liquid using sub-micron size bubbles of ozone or chlorine dioxide dispersed in liquid and may be used in conjunction with an oxidizing liquid.

U.S. Pat. No. 6,207,064 by Gargas, Mar. 27, 2001 ozone contact chamber in which there is laminar stratification of gas in a turbulent contact chamber to ensure a high degree of dissolution of ozone in water to oxidize organic and metal impurities in water.

U.S. Pat. No. 6,126,842 by Decker, Oct. 3, 2000 involves a low-concentration ozone waste-water treatment whereby a low concentration of ozone gas in oxygen is injected into a wastewater stream to reduce pollutants.

U.S. Pat. No. 6,103,130 by Sherman, Aug. 15, 2000, treatment of contaminated liquids with ozone or chlorine dioxide formed into sub-micron size bubbles dispersed into a flowing contaminated liquid.

U.S. Pat. No. 6,090,294 by Teran, et al., Jul. 18, 2000, entails a water purification apparatus and method whereby the wastewater level is automatically monitored and self-adjusted until the desired level of purification is reached. The water is recycled if not clean enough. The treatment process being controlled involves dissolving ozone into water and includes multiple pressurized contact columns to increase its contact time.

U.S. Pat. No. 5,785,866 by Gehringer, et al., Jul. 28, 1998, is a process to treat water contaminated with halogenated ethylenes for consumption by humans and animals whereby ozone is mixed into water that is near drinking water quality except for the mentioned contaminants after which the water is irradiated with electrons at which time the ozone leaves the water.

Other means for cleaning volatile organic compounds are currently used. More common methods include activated carbon and air stripping for ex situ processes, bioremediation and injection of liquid oxidants for subsurface contamination. Also, soil is commonly excavated and brought to landfills which often simply transfers the problem to a new location.

In the 1980's it was common to use activated carbon to treat water for hazardous waste site cleanup. Drawbacks include precipitation of other components of water and formation of bacterial slime, both of which clog the carbon, making it increasingly difficult with progression of operating time, to pass the water through it for treatment. The contaminated carbon requires disposal as a hazardous waste or regeneration and purchase of replacement carbon to continue the process. Certain types of volatile organic compounds, including chlorinated hydrocarbons, are not as readily treatable with activated carbon, require longer residence times in the carbon and use up more limited adsorption sites within the carbon much more quickly making the activated carbon an impractical solution, particularly for these chlorinated hydrocarbons and other hard to treat compounds.

An improvement for some applications came with the advent of air strippers. This technology involves spraying or atomizing water through a nozzle into a column filled with packing to complicate its pathway and thereby elongate its residence time in the column where it is exposed to a current of air blowing counter to the gravitationally driven downward direction of the atomized water droplets undergoing treatment. The volatile organic compounds are transferred to the air stream and the air stream is then treated either by activated carbon or catalytic oxidation with incineration or just incineration; or in other cases the pollutant-laden air stream is discharged directly to the atmosphere.

Operational problems include precipitation and deposition of mineral and particulate components of the water onto the packing material which eventually becomes too clogged to be effective and requires disposal and replacement. If using activated carbon, again there is a disposal issue and limit to its effectiveness with certain contaminants. The incineration of discharged waste contaminant-laden gases involves high capital costs and high fuel costs. Air monitoring is needed in addition to the water monitoring which adds to costs of operation. There is a structural concern for installing these typically tall units that needs to be properly addressed and which also pose an aesthetic concern.

An improvement to air strippers was another air stripping device whereby air is bubbled through the contaminated water instead of spraying it onto the packing material. This allows for a lower profile unit that is easier to install. The units still require maintenance and generate a volatile organic compound-laden waste exhaust requiring treatment.

It was a natural progression for ozone bubbling to follow along this line of development in volatile organic compound stripping. Dissolving and bubbling ozone in water is less expensive than the current invention when used in applications where it is effective.

As has been discussed, dissolving or bubbling ozone is reportedly adequate for disinfection in drinking water and food where lower concentrations of ozone are effective, but it does not work as well at removing volatile organic compounds. By contrast the current invention involving the volatilization of volatile organic compounds from water into ozone, allows for a more predictable reaction. Further improvement comes with use of sensors and controllers, to optimize use of the ozone for more effective and efficient treatment.

BRIEF SUMMARY OF THE INVENTION

Object of the Invention

The current invention is a less expensive, more efficient, effective and more environmentally compatible and sustainable means to clean up volatile organic compound water for improvement of environmental quality, drinking water, and other uses as compared with currently available treatment options. For certain types of chemicals, including halogenated hydrocarbons that do not adsorb well to activated carbon, this technology offers another approach to achieve cleanup goals with improved aqueous effluent quality.

Invention Overview

Utilizing state of the art means for generating ozone at the site of treatment, the current invention involves the volatilization of volatile organic compounds from water and destruction of the volatilized molecules. When water is heated by the heat of reaction from the process of oxidizing the volatile organic compounds, it causes more volatile organic compounds to volatilize from the water. Also, the immediate destruction of the volatilized compounds steepens the concentration gradient, thereby promoting further volatilization of volatile organic compounds from the water.

There is little to no waste gas; the remaining ozone is either run through carbon filters where it becomes neutralized by reacting with the carbon, or used with activated carbon that is a waste product of another type of volatile organic carbon cleaning process whereby the waste ozone acts to regenerate the spent carbon.

BRIEF DESCRIPTION OF SEVERAL VIEWS OF THE DRAWING

FIG. 1: Downward Water Spray Configuration 1; Section View

Figure 1:
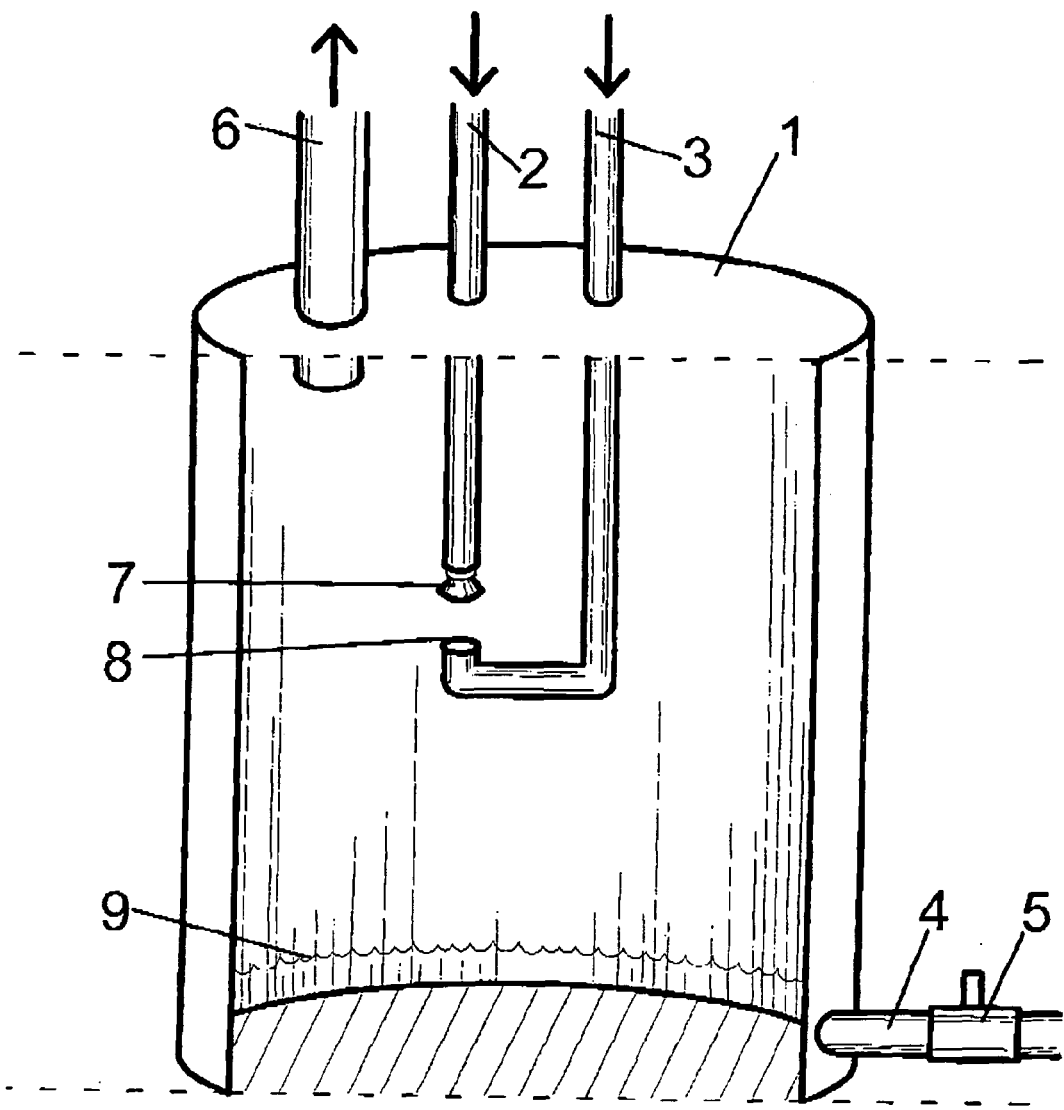
FIG. 1 shows a first embodiment.

Depicted in FIG. 1 is a cross-sectional view of a typical in-line continuous flow or batch treatment apparatus setup for remedial applications where spatial constraints are not a limiting factor. The reaction chamber (1) is a free-standing and vertically oriented cylindrical atmospheric vessel which receives contaminated water for treatment via an aqueous influent pipe (2), and ozone and carrier gas through ozone influent tubing (3), both of which enter the chamber from the top. The ozone influent tubing is located below the terminus of the influent pipe which is fitted with an atomizing spray nozzle (7) at the point at which atomized droplets are at their smallest formation size (8). Contaminated water enters the chamber through this downward facing atomizing spray nozzle and treatment of water droplets occurs as they are directed by gravity to the bottom of the chamber. Treated water is collected in the bottom of the chamber (9) and exits through an aqueous effluent pipe (4) located in the bottom sidewall of the chamber that is fitted with a ball valve (5) to regulate discharge. Pressure that would otherwise be created in the chamber as a result of inflowing gas and water is alleviated through a gaseous exhaust pipe (6) located at the top of the chamber.

Figure 2:
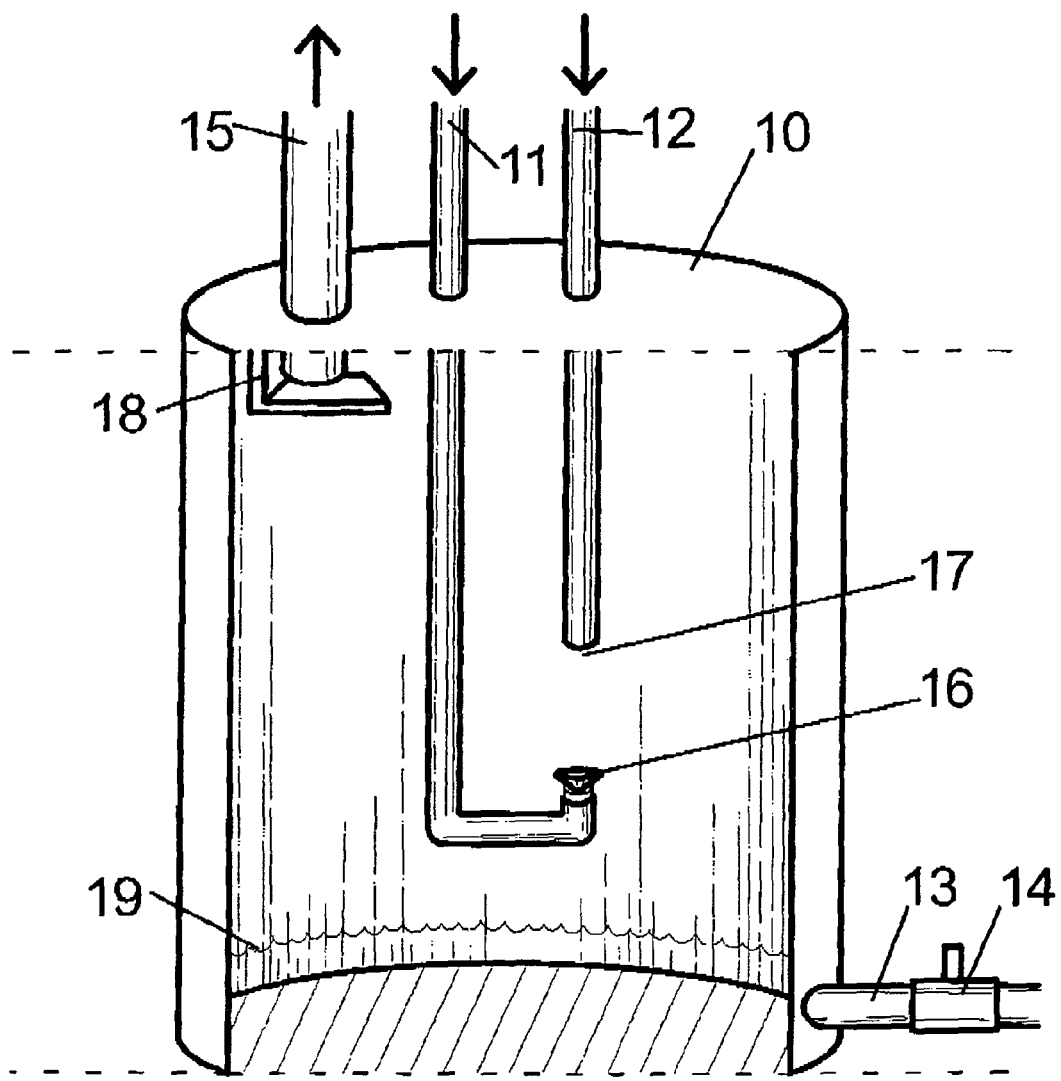
FIG. 2 shows a second embodiment.

FIG. 2: Upward Water Spray Configuration 2; Section View

Depicted in FIG. 2 is a cross-sectional view of a typical in-line continuous or batch treatment apparatus setup utilized when vertical constraint is a limiting factor. The reaction chamber (10) is a free-standing and vertically oriented cylindrical atmospheric vessel which receives contaminated water for treatment via an aqueous influent pipe (11), and ozone and carrier gas through ozone influent tubing (12), both of which enter the chamber from the top. In this configuration the influent pipe that is fitted with an atomizing spray nozzle (16) at its terminus is located below the ozone influent tubing at the optimal point at which atomized water droplets are at their smallest formation size (17). Contaminated water enters the chamber through the atomizing spray nozzle that is pointed upward in order to arch the trajectory of the water and increase residence time due to the restricted height of the chamber. Treatment of water droplets occurs as they are propelled upward after leaving the atomizing spray nozzle and as they are directed downward by gravity to the bottom of the chamber. Treated water is collected in the bottom of the chamber (19) and exits through an aqueous effluent pipe located in the bottom sidewall of the chamber (13) that is fitted with a ball valve (14) to regulate discharge. Pressure that would otherwise be created in the chamber as a result of inflowing gas and water is alleviated through a gaseous exhaust pipe (15) located at the top of the chamber. The outlet to said exhaust pipe (15) is preceded by baffles (18) to minimize exiting of unused ozone gas.

Figure 3A:
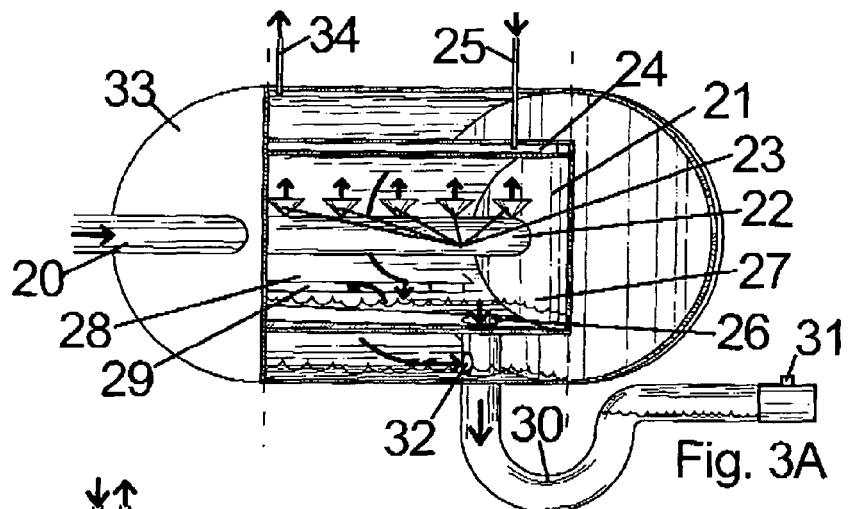
FIG. 3A-3C shows various aspects and views of a third embodiment.

FIG. 3A: Contained Multiport Atomizer Configuration 3; Section View

Depicted in FIG. 3A is a cross-sectional side view of an in-line continuous flow apparatus for lower flow remedial applications in which spatial constraints and portability considerations favor its use. This view depicts the typical installation orientation of the apparatus, horizontal with respect to the ground surface. In this configuration an influent pipe (20) connects and conveys contaminated water to a multipart atomizer (22) located within the cylindrical reaction chamber (21). Contaminated water passes through the atomizing spray nozzles (23) attached to the ports of the multipart atomizer into the reaction chamber containing ozone gas where the water is treated. Ozone is continuously supplied to the reaction chamber through a series of baffles (24) located at the top of the chamber which prevent atomized water from entering the ozone influent tubing (25). Atomized water is directed gravitationally and by the inner walls of the reaction chamber to an aqueous effluent pipe (26) located at the bottom of the reaction chamber; a treated water reservoir (27) is maintained at the bottom of the reaction chamber to prevent ozone gas from exiting via the aqueous effluent pipe. Exhaust gas is directed from within the inner chamber to the outer chamber through inner chamber vents (28). These vents are protected from water infiltration, which would prevent gas from exiting the reaction chamber, by having a drip edge and overflow ports (29) located below the inner chamber vents. The overflow ports prevent the treated water reservoir level in the reaction chamber from rising above the vents. The treated water reservoir within the inner chamber is maintained in part by these overflow ports, but also by a water trap (30) located along the aqueous effluent piping immediately down flow from the drain pipe, and a ball valve (31) used to control discharge. Water entering the outer chamber via the overflow ports is directed back to a one way valve (32) in the aqueous effluent pipe where it passes through the outer chamber (33). In this way water that is exiting the inner reaction chamber via the aqueous effluent pipe is prevented from entering the outer chamber via the aqueous effluent pipe. Gas entering the outer chamber is vented through a gaseous exhaust pipe (34) located at the top of the outer chamber.

Figure 3B:
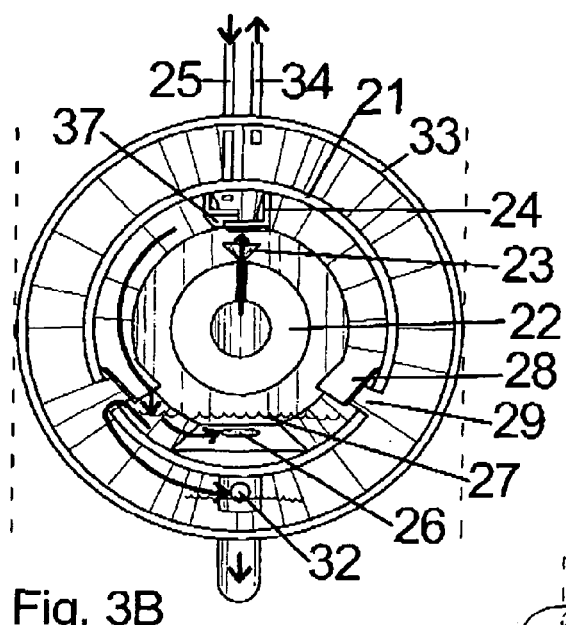

FIG. 3B: Contained Multiport Atomizer Configuration 3; Section View

Depicted in FIG. 3B is a cross-sectional front view of the apparatus. This view better details the baffling above the atomizing spray nozzles and the drip edge, inner chamber vents, overflow ports and space between the inner and outer chambers.

Figure 3C:
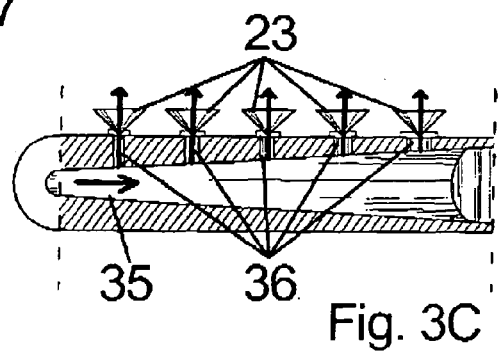

FIG. 3C: Multiport Atomizer; Section View

Depicted in FIG. 3C is an enlarged cross-sectional side view of the multiport atomizer. The increasing circumference of the core (35) within the closed pipe portion of the multiport atomizer (22) with respect to distance travelled away from the point at which water enters the device is meant to create equal amounts of atomization at each of the atomizing spray nozzles (23) and reduce preferential flow of water to the first nozzle of the multiport atomizer. Also to help prevent preferential flow, the diameter of the port holes (36) supplying water to the atomizing nozzles varies with distance from the introduction point of water to the multipart atomizer.

DETAILED DESCRIPTION OF THE INVENTION

There are multiple configurations of the apparatus employing unit processes in common. The specific application will determine the best configuration. Regardless of configurational differences, spatial arrangement, or orientation, the mechanisms that drive the remedial process remain unchanged for each of the configurations.

Following describes first the pre-operational considerations and the process, and then each configuration of the apparatus with regards to application considerations.

Pre-Operational Considerations

In all configurations, prior to contaminated water entering the remedial apparatus via the aqueous influent pipe, influent water may require filtering to limit passage of fine particulate matter into the apparatus, which could cause obstruction of atomizing spray nozzles. Prior to treatment start, the air in the reaction chamber must be replaced by ozone-containing gas. Also, periodically as is required with most equipment dealing with the passage of water, the apparatus will require occasional servicing to remove accumulated mineral deposits; at this time the recommended servicing would be an acid wash to solubilize and remove deposited minerals. All materials that make contact with ozone gas must be constructed of an ozone resistant material such as but not limited to 300 series stainless steel or Kynar®. Materials encountering ozone in solution can also be constructed from PVC. All pipe fittings and pipe-to-chamber junctions are to be air and water tight so as to prevent leakage of water or gas.

Process Description:

Following the pre-operational considerations, the process begins when contaminated water enters the apparatus through an aqueous influent pipe (2,11,20). The water travels to the pipe's end where it traverses an atomizing spray nozzle or nozzles (7, 16, 23). Upon emerging from the atomizing nozzle, the travelling water encounters ozone-air resistance in the reaction chamber (1, 10, 21) and thereby is sheared into water droplets. Smaller droplet size is beneficial to the process and can be enhanced by higher velocities and the greater shearing action of the ozone versus atmospheric air.

Shortly after droplet formation, at the optimal point where the atomized droplets are at their smallest formation size (8, 17, 37), ozone gas is introduced into the reaction chamber, simultaneous to the water, via the ozone influent tubing (3,12, 25). Transfer of volatile organic compounds from the water into the atmosphere of the reaction chamber via volatilization ensues and the ozone reacts with these volatilized compounds creating a steepened contaminant concentration gradient which further enhances contaminant volatilization and degradation. The reaction between the ozone and the contaminants occurs continuously as the water droplets gravitationally fall to the bottom of the reaction chamber. The droplets amass at the bottom of the chamber where the water is maintained as a treated water reservoir (9,19,27). A minimum volume of water retained in the reservoir prevents ozone gas from exiting via the aqueous effluent pipe (4,13,26) which is located near the bottom of the chamber. There is also a ball valve (5, 13, 31) in the aqueous effluent pipe that may be opened to control aqueous discharge as needed. Pressure in the reaction chamber resulting from the inflow of water and ozone gas equilibrates through a gaseous exhaust pipe (6,15, 34) located at the top of the reaction chamber. Locating the exhaust pipe at the top of the chamber reduces the likelihood that ozone will exit the chamber before reacting because ozone is gravitationally directed downward in the atmosphere of the chamber, given its larger molecular mass relative to oxygen and nitrogen. Baffles may be used to direct newly introduced ozone gas away from the gaseous exhaust pipe (18). Ozone and any remaining volatile vapors in the gaseous exhaust are destroyed, captured, or recycled as needed utilizing past, current or state of the art technologies not specific to the processes of this apparatus. Discharge of treated water from the aqueous effluent pipe is regulated by the inline ball valve previously mentioned.

Increasing the introduction pressure of the contaminated water at the atomizing nozzle(s) serves to decrease water droplet size and increase mass transfer efficiencies. Increasing the residence time of the atomized water droplets increases treatment time and removal efficiencies.

Downward Spray Configuration 1

In the Downward Spray Configuration, see FIG. 1, residence time of atomized water droplets in the reaction chamber can be increased as needed by increasing the distance between the atomizing nozzle and the surface of the maintained treated water reservoir at the bottom of the reaction chamber. The Downward Spray Configuration of the invention can be utilized in either an in-line continuous-flow or batch treatment mode of operation, and would be used primarily in remedial situations where spatial constraints are not a limiting factor. For large scale operations per Configuration 1, the atomizing effect could be achieved by the downward spray in a water fall or cascade series. Another approach would be to add additional atomizing nozzles.

Upward Spray Configuration 2

In the upward spray configuration, see FIG. 2, residence time of atomized water droplets in the reaction chamber is increased by arching the trajectory of the atomized droplets prior to their decent and making of contact with the surface of the treated water reservoir. This configuration can be utilized in applications where there are vertical constraints and increasing the distance between the atomizing spray nozzle and the maintained treated water reservoir is not practically applicable. For large scale operations per Configuration 2, the atomizing effect could be achieved by the upward spray resulting from hydraulic jump at the upturned end of a water chute. Another approach would be to add additional atomizing nozzles.

Contained Multiport Atomizer Configuration 3

This configuration, see FIG. 3A and FIG. 3B, is designed to handle lower-flow contaminated water streams and to be the most portable means for utilizing the technology. A typical application for its employment would be remediating groundwater at hazardous waste and construction sites. In an effort to maintain its usability given its reduction in size, the multiport atomizer, see FIG. 3C, was devised. The multiport atomizer increases the volume of water capable of being treated at one time by increasing the number of inline atomizing ports connected to the influent piping.

The design of the multiport atomizer, see FIG. 3C, allows for an increase in flow. Adding ports and nozzles reduces unit pressure within the device, and the shape of the internal core allows for a more uniform volume of water to be atomized at each nozzle, regardless of its location in-line.

The invention claimed is:

1. An apparatus for water treatment based on the use of ozone gas to remove and break down organic compounds that are volatilized from atomized water droplets, comprising:

- a vessel having a top and a bottom and inner and outer chambers,
- a multiport sprayer having spray nozzles connected to an influent pipe to atomize the incoming fluid in the vessel,
- an ozone inlet provided at the top of the inner chamber and fluidly connected to a source of ozone and to provide ozone into the inner chamber,
- a series of baffles located at the top of the inner chamber and covering the ozone inlet to prevent atomized water in the inner chamber from entering the ozone inlet,
- an effluent pipe located at the bottom of the inner chamber,
- at least one vent located on the inner chamber to allow exhaust gas to exit the inner chamber to the outer chamber, and
- at least one drip edge and overflow port located below the location of the at least one vent in the inner chamber,
- whereby water to be treated is pressurized and sprayed through the spray nozzles of the multiport sprayer to atomize the water into the inner chamber containing a relatively lower pressure and ozone gas to remove and break down organic compounds in the atomized water.

2. The apparatus of claim 1, wherein water is treated in a continuous flow mode of operation.

3. The apparatus of claim 2, wherein the inner chamber is continuously replenished with ozone-containing gas while treated water drains from the reaction chamber and continues along the effluent pipe.

4. The apparatus of claim 2, wherein the nozzles of the multiport sprayer are directed upward in the inner chamber.

5. The apparatus of claim 1, wherein water is treated in a batch treatment mode.

6. The apparatus of claim 5, wherein the inner chamber is continuously replenished with ozone-containing gas while treated water drains from the reaction chamber and continues along the effluent pipe.

7. The apparatus of claim 5, wherein the nozzles of the multiport sprayer are directed upward in the inner chamber.

8. A water treatment process based on the use of ozone gas to remove and break down organic compounds, comprising:

- providing a treatment apparatus comprising:
  - a vessel having a top and a bottom and inner and outer chambers,
  - a multiport sprayer having spray nozzles connected to an influent pipe to atomize the incoming fluid in the vessel,
  - an ozone inlet provided at the top of the inner chamber and fluidly connected to a source of ozone and to provide ozone into the inner chamber,
  - a series of baffles located at the top of the inner chamber and covering the ozone inlet to prevent atomized water in the inner chamber from entering the ozone inlet,
  - an effluent pipe located at the bottom of the inner chamber,
  - at least one vent located on the inner chamber to allow exhaust gas to exit the inner chamber to the outer chamber, and
  - at least one drip edge and overflow port located below the location of the at least one vent in the inner chamber,
- pressurizing water to be treated in the influent pipe providing a pressurized water,
- providing ozone to the ozone inlet to fill the inner chamber with an ozone gas at a relatively lower pressure than the pressurized water,
- spraying the pressurized water to be treated through the nozzles of the multiport sprayer atomizing the water to be treated, and
- removing and breaking down organic compounds in the atomized water.

9. The method of claim 8, wherein the method is performed as a continuous process.

10. The method of claim 9, further comprising:

- detecting the ozone concentration and organic compound concentrations and adjusting ozone flow rate and concentration and influent flow rate to increase efficiency of ozone usage and percentage of organic compounds destroyed.

11. The method of claim 9, further comprising:

- pre-filtering the water to be treated with a pre-filter to remove solids from the water to be treated and periodically channeling ozone to said pre-filter.

12. The method of claim 8, wherein the method is performed as a batch process.

* * * * *